March 24, 1936.　　　C. C. FARMER　　　2,035,057

COVER PLATE

Filed July 3, 1935　　　3 Sheets-Sheet 1

INVENTOR
CLYDE C. FARMER
BY *Wm. N. Cady*
ATTORNEY

March 24, 1936. C. C. FARMER 2,035,057
COVER PLATE
Filed July 3, 1935 3 Sheets-Sheet 2
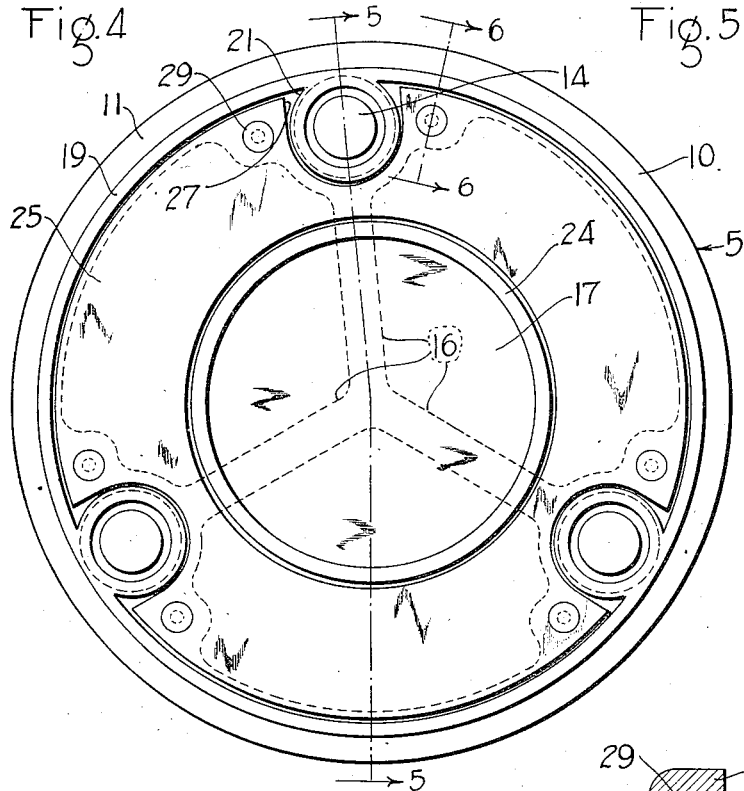
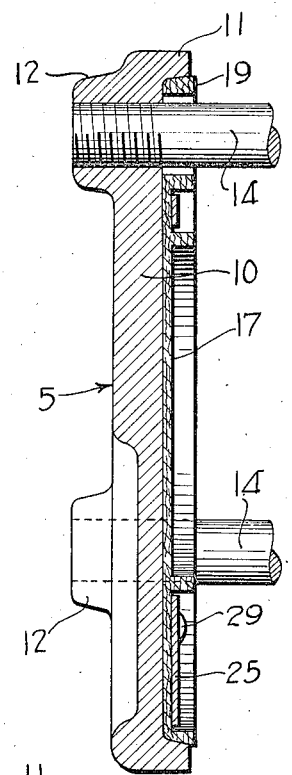
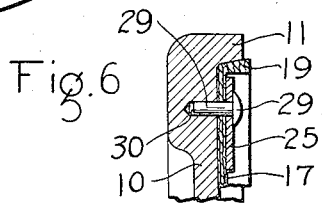
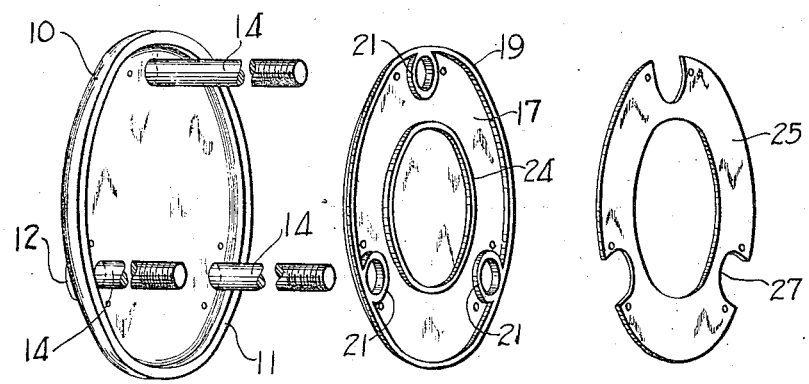
INVENTOR
CLYDE C. FARMER.
BY Wm. M. Cady
ATTORNEY March 24, 1936.  C. C. FARMER  2,035,057
COVER PLATE
Filed July 3, 1935    3 Sheets-Sheet 3

INVENTOR
CLYDE C FARMER
BY *Wm. N. Cady*
ATTORNEY

UNITED STATES PATENT OFFICE 2,035,057

COVER PLATE

Clyde C. Farmer, Pittsburgh, Pa., assignor to The Westinghouse Air Brake Company, Wilmerding, Pa., a corporation of Pennsylvania Application July 3, 1935, Serial No. 29,760

14 Claims. (Cl. 303—1)

This invention relates to a shipping cover or cover plate adapted to be secured to the pipe bracket face of a portion of a brake controlling valve device to protect the operating elements of the valve portion from dirt or foreign matter when the valve portion is detached from the pipe bracket portion.

It is the practice in servicing brake controlling valve devices of the type employed on railway cars to remove the operating portions of these valve devices from pipe bracket portion of the device at periodic intervals and ship them to a central point for testing, repairing and cleaning. It has been found that there is a possibility of injury to the mounting faces of these portions if they are shipped unprotected, and that the operating elements of the valve portions may be covered with dirt or foreign matter, which increases the work of servicing them, or renders them unfit for use if they have been serviced.

It is the principal object of my invention to provide a cover adapted to be secured to the pipe bracket face of a portion of a brake controlling valve device to protect the mounting face of the valve portion, and to protect the valve portion from dirt and foreign matter when the valve portion is detached from the pipe bracket portion, as for instance, when it is being shipped or transported from one place to another.

A further object of the invention is to provide a shipping cover of the type described, and having a gasket permanently associated therewith and adapted to be clamped against the face of a portion of a brake controlling valve device.

Another object of the invention is to provide a cover plate adapted to be placed against the pipe bracket face of a portion of a brake controlling valve device, and to be secured thereto by means extending through the openings provided in the body of the valve portion and through which extend the means by which the valve portion is secured to the pipe bracket section of the brake controlling valve device.

A further object of the invention is to provide a cover plate adapted to be placed against the pipe bracket face of a portion of a brake controlling valve device, the cover plate having a gasket permanently secured thereto and adapted to be clamped between the cover plate and the face of the valve portion to prevent foreign material from entering the valve portion, and having means associated therewith and adapted to extend through openings in the body of the valve portion to secure the cover plate on the face thereof.

Another object of the invention is to provide a cover plate adapted to be placed against the pipe bracket face of a portion of a brake controlling valve device and having means associated therewith and engaging the piston of the brake controlling valve device to prevent movement of the piston towards the cover plate beyond a predetermined distance.

Other objects of the invention and features of novelty will be apparent from the following description taken in connection with the accompanying drawings in which Fig. 1 is a perspective view of a brake controlling valve device of the type with which the covers provided by this invention are designed to be employed, the service and emergency portions of the brake controlling valve device being shown removed from the pipe bracket portion and being turned so as to expose the pipe bracket faces thereof;

Fig. 4 is an elevational view of the cover plate or shipping cover which is adapted to be employed on the service portion of the brake controlling valve device;

Fig. 5 is a sectional view taken substantially along the line 5—5 of Fig. 4;

Fig. 6 is a sectional view taken substantially along the line 6—6 of Fig. 4;

Fig. 7 is a perspective view of the cover shown in Fig. 4, showing the various parts of the cover before assembly;

Figure 1:
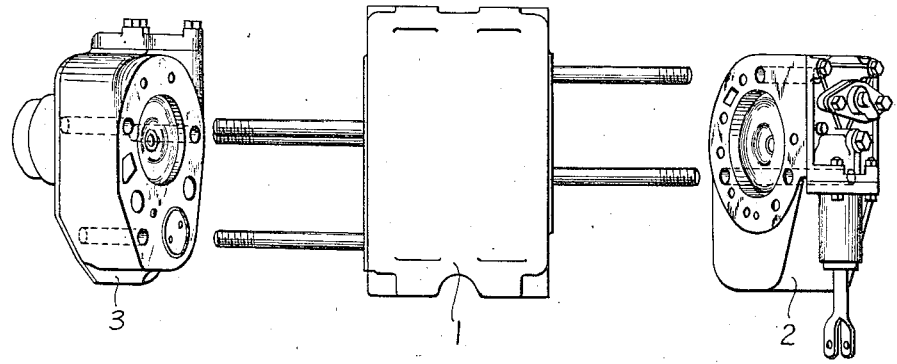

Referring to the drawings I have illustrated in Fig. 1 a brake controlling valve device of the type with which the covers provided by this invention are adapted to be employed, and as shown, the brake controlling valve device comprising a pipe bracket section 1, having on opposite sides thereof mounting faces to which are secured the service portion 2, and the emergency portion 3.

The service and the emergency portions each comprise a body having a piston chamber formed therein and opening on the face of the body which is adapted to be secured against the mounting face of the pipe bracket portion. In addition, each of these valve portions has a plurality of passages formed therein which communicate with ports formed in the face of the body and located outwardly of the piston chamber. The service and emergency portions also each having a plurality of holes formed therein through which extend bolts associated with the pipe bracket portion and by means of which these valve portions are secured against the mounting faces of the pipe bracket portion.

The faces of the service and emergency portions are shaped differently, as is clearly shown in Fig. 1 of the drawings, and different covers are provided for these valve portions. The covers for the two valve portions are of similar construction. The cover adapted for use on the service portion of the brake controlling valve device is indicated generally by the reference numeral 5, while the cover for the emergency portion is indicated by the reference numeral 7. Each of the covers is substantially co-extensive with the mounting face of the valve portion with which it is designed to be employed so that when the cover is in position on the face of the valve portion the entire face will be covered and will be protected from injury.

The cover 5, which is adapted for use on the service portion of the valve device, is shown in detail in Figs. 4 to 7 of the drawings and it will be seen that the cover is substantially circular in outline and includes a substantially rigid member 10 which may be constructed of any suitable material, such as cast metal, and is provided on one face thereof with an annular flange 11 adjacent the periphery thereof. The flange 11 is located so that it will be disposed outside of the ports in the mounting face of the valve portion when the cover is in position thereagainst.

The opposite face of the rigid member 10 is provided with a plurality of projections or bosses 12, in which are located threaded openings into which are fitted threaded rods or bolts 14 which are adapted to extend through the bolt holes in the valve portion and to have nuts 15 fitted on the opposite ends to secure the cover in position against the face of the valve portion. The bosses 12 and the rods or bolts 14 are located adjacent the periphery of the cover and are spaced so as to be in alignment with the bolt holes in the valve portion.

In addition, this face of the member 10 is provided with reinforcing ribs 16 which extend from the bosses 12 to a point adjacent the center of the member 10, as is best shown in Fig. 4 of the drawings.

The cover 5 includes a gasket, indicated generally by the reference numeral 17, and which may be constructed of any suitable material such as molded rubber. The gasket 17 is proportioned so as to be fitted within the flange 11 on the rigid member 10 and is provided with a flange or bead 19 adjacent the periphery thereof which is adapted to engage the mounting face of the valve portion in a substantially continuous line located outwardly of the ports in the face thereof. The bead or flange 19 projects from the face of the gasket a distance sufficient that the plane of the face of the bead is located more remote from the rigid member 10 than the plane of the face of the flange 11 on the rigid member 10, and hence when the cover plate is secured against the face of the valve portion the bead 19 on the gasket 17 engages the face of the valve portion before the flange 11 engages it.

Figure 3:
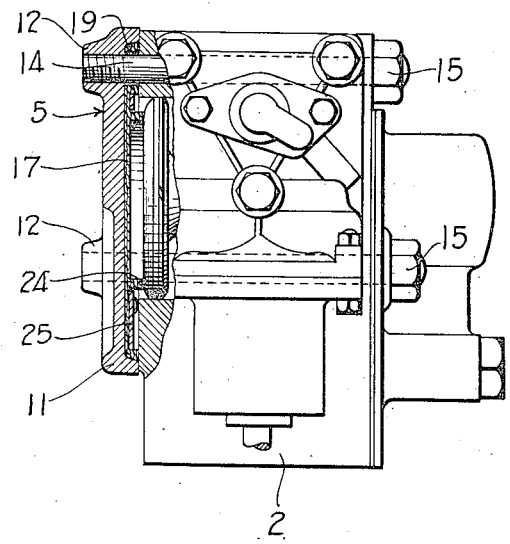
Fig. 3 is a view, partly in section, of the service portion of the brake controlling valve device shown in Fig. 1, with a cover of the type provided by this invention secured to the pipe bracket face thereof.

The gasket 17 is also provided with beads indicated by the reference numerals 21 and which surround the holes in the gasket through which the bolts 14 project. In addition, the gasket 17 is provided with a substantially circular or annular bead, indicated at 24, and located inwardly of the beads 21 which surround the bolt holes. The flange or bead 24 extends from the face of the gasket substantially as far as the bead 19, and is adapted to extend into the piston chamber in the valve portion, and to be engaged by the face of the piston therein, as is best shown in Fig. 3 of the drawings.

Means is provided to permanently secure the gasket in position on the face of the rigid member, and this means comprises a plate indicated generally by the reference numeral 25, and which may be constructed of any suitable material, such as sheet metal. The plate 25 is adapted to fit against the face of the gasket member and to be disposed between the flanges or beads 19 and 24 and is provided with cut-away portions, as indicated at 27, which extend around the beads 21 which surround the bolt holes.

The plate 25 is secured to the body 10 by suitable means, such as by rivets 29, illustrated in Fig. 6 of the drawings, which extend through aligned apertures in the plate 25, and in the gasket 17 and are driven into holes which are drilled in the rigid member 10. The rivets 29 tightly fit the holes in the rigid member 10 so as to resist removal after they are driven into the holes.

In use, as soon as the service portion 2 of the brake controlling valve device is removed from the pipe bracket portion 1, the cover 5 is placed against the exposed face of the valve portion so that the bolts 14 extend through the holes in the body of the valve portion through which the bolts associated in the pipe bracket of the valve device extended. The nuts 15 are placed upon the threaded ends of the bolts which extend through the body of the valve portion and are tightened so as to hold the cover snugly against the face of the valve portion.

When the cover 5 is placed against the face of the valve portion, the bead 19 on the gasket 17 engages the face of the valve portion in a substantially continuous line located outwardly of the ports in the face of the valve portion. When the nuts 15 are tightened on the bolts 14 and the cover is drawn toward the face of the valve portion the bead 19 is compressed, thereby effectively sealing the chamber within the bead from the atmosphere, thus preventing the entrance of dirt or foreign matter into the working portions of the valve device.

After a certain amount of tightening of the nuts 15 on the bolts 14, the flange 11 on the rigid member 10 will be moved into engagement with the face of the valve portion, as shown in Fig. 3 of the drawings, with the result that further compression of the bead 19 on the gasket 17 will be prevented. The flange 11 operates, therefore, to limit the degree to which the bead or flange 19 may be compressed and this protects the bead 19 from too great pressure which might result in its permanent deformation.

When the cover 5 is in position on the face of the valve portion the flange or bead 24 extends into the piston chamber, as shown in Fig. 3 of the drawings, so as to be engaged by the face of the piston of the valve device to limit movement of this piston toward the cover beyond a predetermined distance, and thus to prevent movement of the piston out of the piston chamber in which it is mounted.

It will be seen that the cover provided by this invention is adapted to be employed on the pipe bracket face of a portion of a brake controlling valve device to protect the valve device from dirt and foreign matter when it is detached from the pipe bracket portion, as for instance, when it is being shipped from one place to another.

It will be seen also that the cover provided by this invention has a gasket permanently associated therewith and which is adapted to be clamped against the face of the portion of the brake controlling valve device and which effectively seals the exposed face of this valve device to prevent the entrance of foreign matter.

In addition it will be seen that the cover provided by this invention has means associated therewith to limit or control the extent to which the gasket associated therewith may be compressed, thus insuring that the gasket will not be damaged by being too tightly compressed.

It will be seen also that the cover provided by this invention has means associated therewith to prevent movement of the piston of the brake controlling valve device with which the cover is adapted to be employed out of the piston chamber in which the piston is mounted.

This cover also has means associated therewith and adapted to extend through the holes provided in the valve portion with which the cover is adapted to be employed, and by means of which the cover may be securely held on the exposed face of the valve portion.

Figure 8:
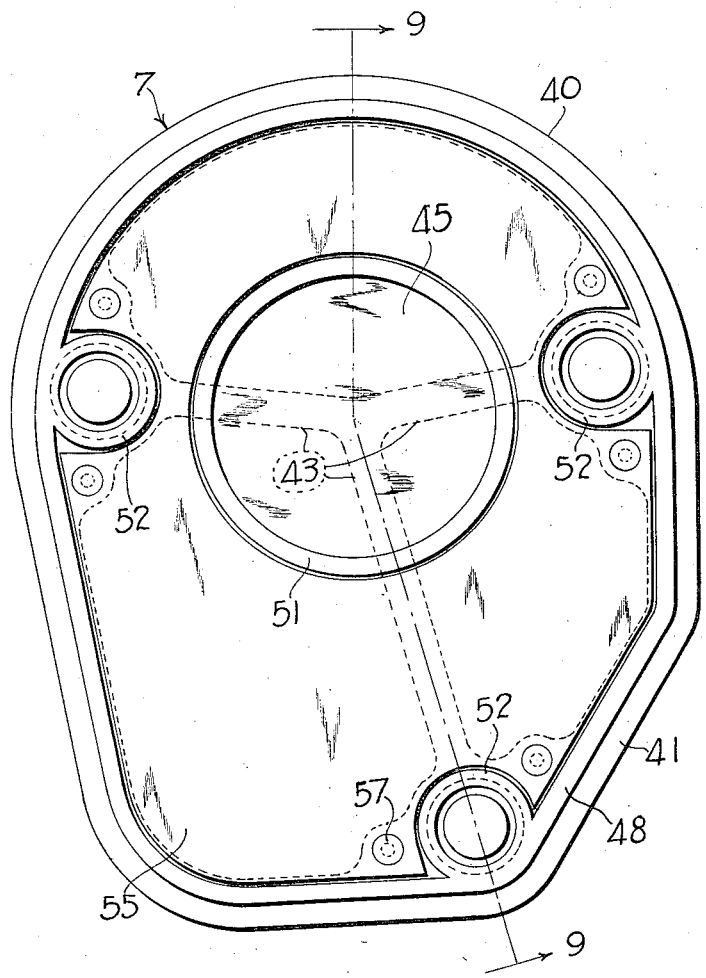
Fig. 8 is an elevational view of the cover plate or shipping cover which is adapted to be used on the emergency portion of the brake controlling valve device.
Figure 9:
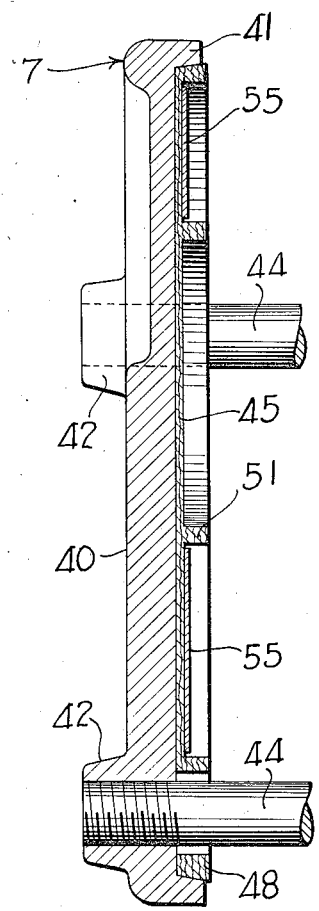
Fig. 9 is a sectional view taken substantially along the line 9—9 of Fig. 8.

The cover 7 which is adapted for use with the emergency portion 3 of the brake controlling valve device is shown in Figs. 8 and 9 of the drawings and is similar in construction to the cover 5 which is adapted to be employed in connection with the service portion of the brake controlling valve device and which is shown in Figs. 4 to 7 of the drawings.

The cover 7 for the emergency portion comprises a rigid member 40, which may be constructed of any suitable material, such as cast iron, and is of an irregular shape similar in outline to the face of the emergency portion 3. The rigid member 40 has a flange or bead 41 formed on one face adjacent the periphery thereof and is also provided on the opposite face with a plurality of bosses 42 in which are formed threaded openings in which are secured the bolts or rods 44. The bosses 42 and the bolts 44 are spaced so as to be substantialy in alignment with the holes in the body of the emergency portion 3, through which extend the bolts associated with the pipe bracket portion 1, and by means of which the emergency portion is secured to the pipe bracket portion.

The rigid member 40 also has formed thereon reinforcing ribs 43 which extend from points adjacent the bosses 42 to a point located centrally of the member, as is best shown in Fig. 8 of the drawings.

The cover 7 also includes a gasket, indicated generally by the reference numeral 45, and which may be constructed of any suitable material, such as molded rubber, and which is similar to the gasket 17 which is employed in connection with the cover 5 for the service portion.

Figure 2:
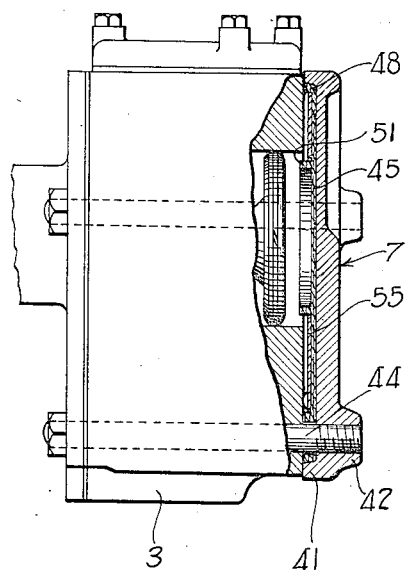
Fig. 2 is a view, partly in section, of the emergency portion of the brake controlling valve device shown in Fig. 1, with a cover of the type provided by this invention secured to the pipe bracket face thereof.

The gasket 45 is provided with a peripheral bead or flange 48 and is shaped to fit within the flange 41 on the rigid member 40. The flange 48 projects from the face of the cover a somewhat greater distance than the flange 41, as is clearly shown in Fig. 9 of the drawings. The gasket 45 is also provided with the centrally located annular bead 51 which is adapted, when the cover plate is in position against the face of the emergency portion of the brake controlling valve device, to extend into the piston chamber in this portion of the valve device, as is clearly shown in Fig. 2 of the drawings, so as to be engaged by the face of the piston to prevent movement of the piston towards the cover plate beyond a predetermined distance. The gasket 45, in addition, is provided with substantially annular beads 52 surrounding the holes through which the bolts 44 extend, which beads are of substantially the same height as the bead 48.

This cover has means associated therewith to maintain the gasket 45 upon the face of the rigid member 40 and this means comprises a plate 55, which is similar to the plate 25 employed in connection with the cover 5 for the service portion of the brake controlling valve device, and is fitted in the area between the inner bead 51 and the outer bead or flange 48 and is provided with cut-away portions adjacent the beads 52 which surround the bolt holes. The plate 55 is held in place by means of rivets 57 which extend through openings in the plate 55 and in the gasket 45, and are driven into holes drilled in the rigid member 40 in a manner similar to that described in detail in connection with the cover for the service portion.

The operation and use of the cover for the emergency portion is similar to that of the cover for the service portion and will not be described in detail.

While one embodiment of the covers adapted for use in connection with the service and emergency portions of a brake controlling valve device have been illustrated and described in detail it should be understood that the invention is not limited to these details of construction and numerous changes and modifications may be made without departing from the scope of the following claims.

Having now described my invention, what I claim as new and desire to secure by Letters Patent, is:

1. In a shipping cover adapted to be secured on the pipe bracket face of a portion of a brake controlling valve device of a type having a piston chamber therein opening on said face and having a plurality of passages therein communicating with ports in said face and located outwardly of the piston chamber, the cover comprising a substantially rigid plate member adapted to be secured to the pipe bracket face of the valve portion and to extend outwardly of the ports in said face when in position thereon, and a gasket molded of resilient material and adapted to be interposed between the plate and the face of the valve portion, the gasket having a bead thereon projecting from the face thereof and adapted to engage the face of the valve portion in a substantially continuous line located outwardly of the ports in the face of the valve portion when the shipping cover is in position on the face of said valve portion.

2. In a shipping cover adapted to be secured on the pipe bracket face of a portion of a brake controlling valve device of a type having a piston chamber therein opening on said face and having a plurality of passages therein communicating with ports in said face and located outwardly of the piston chamber, the cover comprising a substantially rigid plate having an annular flange projecting from a face thereof, the flange being located outwardly of the ports in the face of the valve portion when the plate is in position on the face thereof, a gasket constructed of resilient material and positioned within the flange on the plate member, the gasket having a bead projecting from the face thereof, the bead being located adjacent the periphery of the gasket and being adapted to engage the face of the valve portion in a substantially continuous line located outwardly of the ports in the face of the valve portion, and means associated with said plate for detachably securing the plate to the pipe bracket face of the valve body.

3. In a shipping cover adapted to be secured on the pipe bracket face of a portion of a brake controlling valve device of a type having a piston chamber therein opening on said face and having a plurality of passages therein communicating with ports in said face and located outwardly of the piston chamber, the cover comprising a substantially rigid plate member adapted to be secured to the pipe bracket face of the valve portion and to extend outwardly of the ports in said face when in position thereon, a gasket molded of resilient material and adapted to be interposed between the plate and the face of the valve portion, the gasket having a bead thereupon projecting from the face thereof and adapted to engage the face of the valve portion in a substantially continuous line located outwardly of the ports in the face of the valve portion when the shipping cover is in position in the face of said valve portion, and means located inwardly of said bead for securing the gasket to said plate.

4. In a shipping cover adapted to be secured on the pipe bracket face of a portion of a brake controlling valve device of a type having a piston chamber therein opening on said face and having a plurality of passages therein communicating with ports in said face and located outwardly of the piston chamber, the cover comprising a substantially rigid member adapted to be secured to the pipe bracket face of the valve portion and to extend outwardly of the ports in said face, a gasket molded of resilient material and adapted to be interposed between the rigid member and the face of the valve portion, the gasket having a bead formed thereon projecting from the face thereof and adapted to engage the face of the valve portion in a substantially continuous line located outwardly of the ports in the face of the valve portion, a securing member positioned on the face of the gasket member remote from the rigid member and comprising a relatively thin plate having its exposed face positioned in a plane located intermediate the plane of the face of the bead on the gasket and the plane of the face of the rigid member, and means associated with said securing member and cooperating with the rigid member to secure the gasket on the face of the rigid member.

5. In a shipping cover adapted to be secured on the pipe bracket face of a portion of a brake controlling valve device of a type having a piston chamber therein opening on said face and having a plurality of passages therein communicating with ports in said face and located outwardly of the piston chamber, the cover comprising a substantially rigid member adapted to be secured against the pipe bracket face of the valve portion and having an annular flange projecting from a face thereof and located outwardly of the ports in the face of the valve portion when the member is in position on the face thereof, a gasket constructed of resilient material and positioned within the flange on the rigid member, said gasket having a bead thereon projecting from a face thereof and adapted to engage the face of the valve portion in a substantially continuous line located outwardly of the ports in the face of the valve portion when the cover is in position on said face, the face of the bead on the gasket being located in a plane more remote from the face of the rigid member than the face of the flange on the rigid member.

6. In a shipping cover adapted to be secured on the pipe bracket face of a portion of a brake controlling valve device of a type having a piston chamber therein opening on said face and having a plurality of passages therein communicating with ports in said face located outwardly of the piston chamber, the cover comprising a substantially rigid member adapted to be secured against the pipe bracket face of the valve portion and having an annular flange projecting from a face thereof and located outwardly of the port in the face of the valve portion when the member is in position on the face thereof, a gasket constructed of resilient material and positioned within the flange on the rigid member, said gasket having a bead thereon projecting from a face thereof and adapted to engage the face of the valve portion in a substantially continuous line located outwardly of the ports in the face of the valve portion when the cover is in position on said face, the face of the bead on the gasket being located in a plane more remote from the face of the rigid member than the face of the flange on the rigid member, and means positioned within the flange on the rigid member for securing the gasket to said rigid member.

7. In a shipping cover adapted to be secured on the pipe bracket face of a portion of a brake controlling valve device of a type having a piston chamber therein opening on said face and having a plurality of passages therein communicating with ports in said face located outwardly of the piston chamber, the cover comprising a substantially rigid member adapted to be secured against the pipe bracket face of the valve portion and having an annular flange projecting from a face thereof and located outwardly of the ports in the face of the valve portion when the member is in position on the face thereof, a gasket constructed of resilient material and positioned within the flange on the rigid member, said gasket having a bead thereon projecting from a face thereof and adapted to engage the face of the valve portion in a substantially continuous line located outwardly of the ports in the face of the valve portion when the cover is in position on said face, the face of the bead on the gasket being located in a plane more remote from the face of the rigid member than the face of the flange on the rigid member, and means positioned within the bead on the gasket for securing the gasket to the rigid member.

8. In a shipping cover adapted to be secured on the pipe bracket face of a portion of a brake controlling valve device of a type having a piston chamber therein opening on said face and having a plurality of passages therein communicating with ports in said face located outwardly of the piston chamber, the cover comprising a substantially rigid member adapted to be secured against the pipe bracket face of the valve portion and having an annular flange projecting from a face thereof and located outwardly of the ports in the face of the valve portion when the member is in position on the face thereof, a gasket constructed of resilient material and positioned within the flange of the rigid member, said gasket having a bead thereon projecting from a face thereof and adapted to engage the face of the valve portion in a substantially continuous line located outwardly of the ports in the face of the valve portion when the cover is in position on said face, the face of the bead on the gasket being located in a plane more remote from the face of the rigid member than the face of the flange on the rigid member, and means positioned within the bead on the gasket for securing the gasket to the rigid member, the exposed face of said means being positioned in a plane intermediate the plane of the face of the bead on the gasket member and the plane of the face of the rigid member.

9. In a shipping cover adapted to be secured on the pipe bracket face of a portion of a brake controlling valve device of a type having a piston chamber therein opening on said face and having a plurality of passages communicating with ports in said face and located outwardly of the piston chamber, and having a plurality of holes formed therein and opening on said face and through which bolts associated with the pipe bracket section of the valve device extend to secure the valve portion in position thereagainst, the cover comprising a substantially rigid member adapted to be secured against the face of the valve portion and to extend outwardly of the ports in said face, said rigid member having members associated therewith and adapted to extend through the holes in the valve portion and by means of which the cover may be secured to said valve portion, and a gasket constructed of resilient material and positioned between the rigid member and the face of the valve portion, said gasket having a bead formed thereon and adapted to engage the face of the valve portion in a substantially continuous line located outwardly of the ports in the face of said valve portion.

10. In a shipping cover adapted to be secured on the pipe bracket face of a portion of a brake controlling valve device of a type having a piston chamber therein opening on said face and having a plurality of passages communicating with ports in said face and located outwardly of the piston chamber, and having a plurality of holes formed therein and opening on said face and through which bolts associated with the pipe bracket section of the valve device extend to secure the valve portion in position thereagainst, the cover comprising a substantially rigid member adapted to be secured against the face of the valve portion and to extend outwardly of the ports in said face, said rigid member having members associated therewith and adapted to extend through the bolt holes in the valve portion by means of which the cover may be secured to said valve portion, and a gasket member constructed of resilient material and positioned between the rigid member and the face of the valve portion, said gasket having a bead formed thereon and adapted to engage the face of the valve portion in a substantially continuous line located outwardly of the ports in the face of said valve portion, and means positioned within the bead on the gasket for securing said gasket to the rigid member.

11. In a shipping cover adapted to be secured on the exposed face of a portion of a brake controlling valve device to protect said valve portion from foreign matter, the cover comprising a substantially rigid member adapted to be secured on said face, a gasket constructed of resilient material and interposed between the rigid member and the face of the valve portion, the gasket having a bead formed thereon and adapted to engage the face of the valve portion in a substantially continuous line to enclose the portion of the face of the valve device to be protected, means to secure the rigid member to the valve portion and to compress the bead on the gasket between the rigid member and the face of the valve portion, and means associated with the rigid member and operable to limit the extent to which said bead may be compressed.

12. In a shipping cover adapted to be secured on the exposed face of a portion of a brake controlling valve device to protect said valve portion from foreign matter, the cover comprising a substantially rigid member adapted to be secured on said face, a gasket constructed of resilient material and interposed between the rigid member and the face of the valve portion, the gasket having a bead formed thereon and adapted to engage the face of the valve portion in a substantially continuous line to enclose the portion of the face of the valve portion to be protected, means positioned within said bead for securing said gasket to the rigid member, means to secure the rigid member to the valve portion and to compress the bead on the gasket between the rigid member and the face of the valve portion, and means associated with the rigid member and operable to limit the extent to which said bead may be compressed.

13. In a shipping cover adapted to be secured on the pipe bracket face of a portion of a brake controlling valve device of a type having a piston chamber therein opening on said face and having a plurality of holes in the body thereof and opening on said face and adapted to have extend therethrough means associated with the pipe bracket section of the brake controlling valve device to secure the valve portion in position on said pipe bracket section, the cover comprising a plate adapted to be secured on said face of the valve portion and to overlie the portions of said face outwardly of the piston chamber, and members secured to said plate and adapted to extend through the holes in the body of the valve portion which are adapted to receive the means for securing the valve portion to the pipe bracket section, said members being operable to secure the cover in position on the face of the valve portion.

14. In a shipping cover adapted to be secured on the pipe bracket face of a portion of a brake controlling valve device of a type having a piston chamber therein opening on said face and having a plurality of holes in the body thereof and opening on said face and adapted to have extend therethrough means associated with the pipe bracket section of the brake controlling valve device to secure the valve portion in position on said pipe bracket section, the cover comprising a plate adapted to be secured on said face of the valve portion and to overlie the portions of said face outwardly of the piston chamber, a gasket adapted to be interposed between said plate and the face of the valve portion and to be clamped therebetween, and members secured to said plate and adapted to extend through the holes in the body of the valve portion which are adapted to receive the means for securing the valve portion to the pipe bracket section, said members being operable to secure the cover in position on the face of the valve portion.

CLYDE C. FARMER.